US012006582B2

(12) United States Patent
Sorhuus et al.

(10) Patent No.: US 12,006,582 B2
(45) Date of Patent: Jun. 11, 2024

(54) APPARATUS AND METHOD FOR CONTROLLED ALUMINA SUPPLY

(71) Applicant: REEL ALESA AG, Zurich (CH)

(72) Inventors: Anders Kenneth Sorhuus, Oslo (NO); Sivert Ose, Oslo (NO)

(73) Assignee: REEL ALESA AG, Zurich (CH)

( * ) Notice: Subject to any disclaimer, the term of this patent is extended or adjusted under 35 U.S.C. 154(b) by 889 days.

(21) Appl. No.: 17/053,242

(22) PCT Filed: May 17, 2019

(86) PCT No.: PCT/EP2019/062865
§ 371 (c)(1),
(2) Date: Nov. 5, 2020

(87) PCT Pub. No.: WO2019/219940
PCT Pub. Date: Nov. 21, 2019

(65) Prior Publication Data
US 2021/0164119 A1    Jun. 3, 2021

(30) Foreign Application Priority Data
May 18, 2018  (EP) ..................................... 18173125

(51) Int. Cl.
*C25C 3/00*     (2006.01)
*B01D 39/08*   (2006.01)
*B01D 53/12*   (2006.01)
*C25C 3/20*     (2006.01)
*C25C 3/22*     (2006.01)

(52) U.S. Cl.
CPC ................ *C25C 3/22* (2013.01); *B01D 39/08* (2013.01); *B01D 53/12* (2013.01); *C25C 3/20* (2013.01); *B01D 2253/104* (2013.01)

(58) Field of Classification Search
CPC .. C25C 3/22; C25C 3/20; B01D 39/08; B01D 53/12; B01D 2253/104
See application file for complete search history.

(56) References Cited

U.S. PATENT DOCUMENTS

| 4,501,599 A | 2/1985 | Loukos |
| 5,885,539 A | 3/1999 | Bjarno et al. |
| 2013/0327215 A1* | 12/2013 | Sorhuus ............... B01D 53/508 95/131 |

FOREIGN PATENT DOCUMENTS

| EP | 2407228 A1 | 1/2012 |
| EP | 2489422 A1 | 8/2012 |

* cited by examiner

*Primary Examiner* — Zulmariam Mendez
(74) *Attorney, Agent, or Firm* — MARSHALL, GERSTEIN & BORUN LLP

(57) ABSTRACT

An apparatus and a method are useful for removing pollutants from process effluent gas produced by an electrolytic cell used in an aluminum production plant to produce aluminum. The apparatus and method use a flow control device to control alumina supply to an electrolytic cell and to a dry scrubber contact reactor.

15 Claims, 2 Drawing Sheets

APPARATUS AND METHOD FOR CONTROLLED ALUMINA SUPPLY

TECHNOLOGY FIELD

The present disclosure relates to an apparatus and a method for removing pollutants from process effluent gas produced by electrolytic cells used in an aluminum production plant. More particularly, the present disclosure relates to an apparatus and a method for controlling alumina supply to an electrolytic cell and to a singularly dedicated dry scrubber.

BACKGROUND OF THE DISCLOSURE

In the process for electrolytic production of aluminum, such as by the Hall-Héroult process, aluminum is produced by reducing aluminum oxide in an electrolytic smelting pot filled with melted electrolyte in the form of a fluoride-containing mineral. During the process, effluent gas is produced comprising fluoride-containing substances such as hydrogen fluoride (HF) and fluorine containing dust. As these substances are extremely damaging to the environment, the substances must be separated before the process effluent gas may be discharged into the surrounding atmosphere. At the same time, the fluorine-containing melt is essential to the electrolytic process, and thus recovery of the fluoride-containing substances is desirable for recirculation to the electrolysis process. This recirculation may take place by adsorption of the fluorine-containing substances on a particulate adsorbent.

As noted, the electrolytic reaction occurring in the electrolytic smelting pots produces process effluent gas in the form of hot, particle-laden effluent gas, typically cleaned in a gas cleaning unit before being discharged to the atmosphere. An example of a gas cleaning unit for cleaning the effluent gas generated in electrolytic smelting pots is disclosed in U.S. Pat. No. 5,885,539. The gas cleaning unit disclosed in U.S. Pat. No. 5,885,539 comprises a first contact reactor and a second contact reactor. The effluent gas from the electrolytic smelting pots is first forwarded to the first contact reactor and is, in the first contact reactor, brought into contact with recycled alumina. The partly cleaned effluent gas is then forwarded to the second contact reactor and is, in the second contact reactor, brought into contact with fresh alumina. The partly used alumina is recycled from the second contact reactor to the first contact reactor. A dust removal device removes the alumina from the effluent gas, which is then discharged to the atmosphere.

The system for recovery of fluoride compounds comprises a filter system, which is included in a closed system. Stable transport of effluent gas from the aluminum production process to the filter system is important. Stable transport is accomplished using gas ducts through which the effluent gas, by means of large fans, is conveyed. The gas ducts comprise main ducts and branch ducts fluidly connected to the filter system. For each aluminum production electrolytic cell, a branch duct is brought into or connects with the main duct. The cross section of the main duct increases gradually, by means of diffusers as the transported effluent gas quantity increases. It is very important for the environment, but also for the electrolytic process, that effluent gas distribution is as even as possible. Traditionally, even effluent gas distribution is achieved by an increasingly stronger throttling of the effluent gas transported within the branch duct, the closer the proximity of the particular branch duct to the suction fans. Throttling represents sheer energy loss through a pressure drop.

Gas cleaning units for cleaning of process effluent gas produced during electrolytic processing of aluminum include both centralized systems and decentralized systems. Centralized systems often connect to one or several halls comprising electrolytic cells whereby each hall may comprise from 70 to 200 electrolytic cells, with cleaning equipment arranged centrally between the halls or outside. The centralized system connects with each of the electrolytic cells by means of comprehensive and costly ductwork. Aluminum oxide used as an adsorbent agent during the effluent gas cleaning process is stored in separate silos, i.e., a silo for aluminum oxide storage before use and a silo for aluminum oxide storage after use in the effluent gas cleaning process. Aluminum oxide stored after use is later transported back to each cell by means of transportation vehicles, cranes or other transportation system for aluminum, such as a system for transportation of aluminum in a compact phase.

Decentralized systems are used to clean process effluent gas from 5 to 40 electrolytic cells, more preferably from 10 to 20 electrolytic cells. As such, less ductwork is required, and transportation needs for movement of aluminum oxide are greatly reduced. Large flexibility is achieved as to operation start up, and distance between aluminum oxide storage and the electrolytic cells may be minimized. Additional benefits achieved by decentralized systems are described in U.S. Pat. No. 6,406,524.

Although systems for cleaning process effluent gas produced during electrolytic processing of aluminum are known, improved systems that reduce operation costs, reduce equipment footprint, reduce capital costs, and/or increase adaptability to meet specific system requirements for larger production facilities, are still needed in the aluminum production industry.

SUMMARY OF THE DISCLOSURE

The present disclosure relates to an apparatus and a method for removing pollutants from process effluent gas produced by electrolytic cells used in an aluminum production plant. More particularly, the present disclosure relates to an apparatus and a method for controlling a supply of alumina to an electrolytic cell and to a singularly dedicated dry scrubber contact reactor. According to an embodiment of the present disclosure, apparatus is provided wherein each single aluminum electrolytic cell is arranged at a level below that of a singularly dedicated dry scrubber contact reactor for removal of gaseous pollutants, such as hydrogen fluoride, from effluent gas produced by the aluminum production process. The single aluminum electrolytic cell comprises a number of anode electrodes, typically six to thirty anode electrodes, typically arranged in two parallel rows extending along a length of the electrolytic cell and extending into molten contents of a bath. The electrolytic cell also comprises one or more cathode electrodes. The process occurring in the electrolytic cell may be the well-known Hall-Héroult process in which aluminum oxide, also referred to herein interchangeably as "alumina", is dissolved in a melt of fluorine containing minerals and electrolyzed to form aluminum. Hence, the electrolytic cell functions as an electrolysis cell. Powdered aluminum oxide is supplied to the electrolytic cell from an alumina hopper via gravity, fluidization, mechanical transport and/or similar means. Powdered aluminium oxide is supplied to the bath of the electrolytic cell by means of feeders. Each feeder may be provided with a feeding pipe, a feed port and a crust breaker operative for forming an opening in a crust that often forms on a surface of contents within the bath. An example of a crust breaker is described in U.S. Pat. No. 5,045,168.

The electrolysis process occurring in the electrolytic cell generates significant amounts of heat, dust particles, and effluent gas including but not limited to hydrogen fluoride, sulphur dioxide, carbon dioxide, and perfluorinated chemicals (PFCs), i.e., pollutants. The electrolytic cell is arranged within an enclosed housing that defines an interior area. The interior area of the housing includes an outlet. A fan draws effluent gas from the housing via the outlet into an effluent gas treatment system. The fan is preferably located downstream of the effluent gas treatment system to generate a negative pressure within the effluent gas treatment system. However, other arrangements may be utilized for the transport of effluent gas. Due to the negative pressure generated by the fan, some volume of ambient air is drawn into the housing interior area mainly via gaps or openings between side wall doors of the housing. The effluent gas drawn from the housing interior area thereby comprises effluent gas, dust particles generated in the aluminum production process, and a volume of ambient air.

In the singularly dedicated effluent gas treatment system arranged at a level vertically above that of the electrolytic cell, effluent gas flows upwardly through a dry scrubber contact reactor in which an adsorbent agent, typically aluminum oxide, is dispersed and thereafter utilized in the aluminum production process. The dispersed aluminum oxide mixes with the effluent gas and interacts with some components of the effluent gas, particularly hydrogen fluoride, HF, and sulphur dioxide, $SO_2$, to produce contacted gas. The particulate adsorption products formed by the interaction of aluminum oxide with hydrogen fluoride and sulphur dioxide are entrained in the contacted gas flowing vertically or upwardly from the dry scrubber contact reactor through the effluent gas treatment system to a fabric filter. The particulate adsorption products are removed from the contacted gas via the fabric filter to produce treated gas. In addition to removing hydrogen fluoride and sulphur dioxide from the effluent gas, the effluent gas treatment system via the fabric filter also separates at least a portion of the dust particles entrained within the contacted gas from the housing interior area.

The subject dry scrubber contact reactor is arranged downstream of the alumina hopper, which according to one embodiment extends horizontally across a partly porous bottom surface of the effluent gas treatment system housing. Arranged a distance vertically below the partly porous bottom surface is a solid base wall. The effluent gas treatment system housing comprises a top, a partly porous bottom surface with a solid base wall just below, and two opposed side walls defining an open interior. The dry scrubber contact reactor is supplied alumina via the alumina hopper. As such, the alumina flows across the partly porous bottom surface of the effluent gas treatment system from a flow control device to the dry scrubber contact reactor via gravity, fluidization, mechanical transport and/or similar means. The dry scrubber contact reactor is equipped with an effluent gas inlet for a flow of effluent gas therethrough with alumina dispersal into and mixture with the effluent gas within the dry scrubber contact reactor. The effluent gas inlet is arranged between a portion of the side wall of the housing and a retaining wall that abuts free ends of the porous bottom surface and solid base wall, and extends vertically upwardly from the free ends to a free overflow edge. The retaining wall is distanced from the side wall to allow a flow of effluent gas therebetween into the dry scrubber contact reactor. Similarly, according to one embodiment, the dry scrubber contact reactor is arranged between a movable scrubber free wall that extends generally parallel to the side wall from a free base end to an opposed free top end. The scrubber free wall may be electronically and/or manually movable through adjustment of an arm equipped with hinges connected thereto. The arm, connected to the side wall, may have a hinge at or near the side wall. The arm, also connected to the scrubber free wall, may have a hinge at or near the scrubber free wall. Further, the arm may also have a hinge arranged between those of the side wall and the scrubber free wall. The arm equipped with hinges, or other movement mechanism, enables electronic and/or manual movement of scrubber free wall vertically, i.e., closer to or farther from the porous bottom surface, and horizontally, i.e., closer to or farther from the side wall. Through movement and positioning of the scrubber free wall, the supply of alumina to the dry scrubber contact reactor may be controlled or adjusted. Hence, if the scrubber free wall is arranged relatively closer to the porous bottom surface, the supply of alumina is decreased. If the scrubber free wall is arranged relatively farther from the porous bottom surface, the supply of alumina is increased. If the scrubber free wall is arranged relatively closer to the side wall, the supply of alumina is increased. If the scrubber free wall is arranged relatively farther from the side wall, the supply of alumina is decreased. The flow control device controls the flow of alumina to the alumina hopper. The flow control device comprises a first portion formed of an elongated tubular or similarly shaped hollow configuration. The first portion is arranged vertically with a top inlet end fluidly connected to a primary alumina supply. An opposed bottom outlet end of the first portion is connected to or unitarily formed with a vertically arranged second portion. The second portion defines an open interior area extending from a free base edge of sides that taper inwardly and upwardly to an opposed connection end. The connection end of the second portion connects to the bottom outlet end of the first portion. As such, primary alumina flows through the flow control device from the top inlet end of the first portion to a base opening defined by the free base edge of the second portion. The flow control device may be movable. The flow control device may be electronically and/or manually movable through adjustment of an arm equipped with hinges connected thereto. The arm is connected to the side wall and may have a hinge at or near the side wall. The arm is also connected to the flow control device and may have a hinge at or near the flow control device. Further, the arm may have a hinge arranged between those at the side wall and at the flow control device. The arm equipped with hinges, or other such movement mechanism, enables electronic and/or manual movement of the flow control device vertically, i.e., closer to or farther from the porous bottom surface, and horizontally, i.e., closer to or farther from the side wall. Through movement and positioning of the flow control device, the supply of alumina to the alumina hopper, and hence, the electrolytic cell and the dry scrubber contact reactor may be controlled or adjusted.

Since the electrolytic cell is supplied alumina from the alumina hopper, which also supplies alumina to the dry scrubber contact reactor, the rate of alumina demand by the electrolytic cell determines or controls the rate of alumina supply via the flow control device to the singularly dedicated dry scrubber contact reactor. Accordingly, alumina is transported from a primary alumina supply, to the flow control device arranged vertically within the effluent gas treatment system housing for a gravity fed flow of alumina therethrough. The free base edge of the flow control device is arranged a predetermined distance based on system requirements from the partly porous bottom surface of the effluent gas treatment system housing to be within, or below a top surface of the alumina within the alumina hopper. According to the embodiment, an air supply is fluidly connected to the housing to supply air between the solid base wall and the partly porous bottom surface. The air supply may be a fan, a blower, or similar such device. Air supplied between the solid base wall and the partly porous bottom surface flows upwardly through openings arranged in a portion or portions of the porous bottom surface thereby fluidizing a portion of the alumina supported on the porous bottom surface. As such, a certain static amount of primary alumina intentionally builds under the second portion of the flow control device adjacent the side wall of the effluent gas treatment system housing. As the static amount of primary alumina builds within the open interior area of the second portion, gravity flow of alumina through the first portion becomes slowed or blocked. As a certain amount of alumina flows from beneath the second portion via fluidization and/or gravity to the alumina hopper supplying alumina to the electrolytic cell via a feeding pipe, a portion of the static amount of the primary alumina becomes free and shifts away, again allowing a flow of primary alumina from the first portion. Such flow of alumina continues unless or until the flow is again slowed or blocked by a build-up of a static amount of primary alumina beneath the second portion of the flow control device. Through this ebb and flow of primary alumina from the flow control device, alumina supplied to the electrolytic cell, as well as to the dry scrubber contact reactor downstream of the feeding pipe, is controlled. For a further, possibly as an "as needed" intermittent boost, the air supply may be connected to one or more air booster devices. According to an embodiment, an air booster device may be arranged at the side wall below the flow control device. The air booster device arranged below the flow control device may be used intermittently to locally increase air supply to alter or boost fluidization conditions of the alumina under the second portion of the flow control device to intermittently increase alumina supply to the alumina hopper. Also, according to the embodiment, an air booster device may be arranged above the porous bottom surface at the retainer wall. The air booster device arranged at the retainer wall may be used intermittently to locally increase air supply to alter or increase fluidization conditions to intermittently increase alumina supply to the dry scrubber contact reactor.

The subject fabric filter is arranged in an upper portion of the effluent gas treatment system housing at a level vertically above the flow control device, alumina hopper, and dry scrubber contact reactor. The subject fabric filter comprises a support wall arranged to extend across a portion of the effluent gas treatment system housing to create a barrier separating an "after-filter" area on one side of the support wall from a "before-filter" area on the opposite side of the support wall. A plurality of openings extends through a thickness of the support wall, with each opening equipped with a replaceable fabric filter bag that extends from the opening into the before-filter area. Arranged in the after-filter area is an outlet through which treated gas flows outwardly from the after-filter area of the effluent gas treatment system housing, to further treatment equipment or to the atmosphere.

A method of using the subject effluent gas treatment system comprises arranging the subject effluent gas treatment system at a level vertically above that of an electrolytic cell operable to produce aluminum, fluidly connecting the subject effluent gas treatment system to the electrolytic cell via a feeding pipe and an effluent gas outlet, wherein the feeding pipe is connected to the effluent gas treatment system alumina hopper and the effluent gas outlet is connected to the dry scrubber contact reactor, supplying alumina to the effluent gas treatment system via a flow control device, wherein the flow control device supplies alumina to the electrolytic cell and to the dry scrubber contact reactor at a rate based on the electrolytic cell alumina demand, interacting dispersed alumina with effluent gas in the dry scrubber contact reactor for pollutant removal from the effluent gas to produce contacted gas entrained with particulate adsorption products, and removing the particulate adsorption products from the contacted gas in a fabric filter to produce clean gas.

A method of using the subject flow control device for alumina supply comprises providing a vertically arranged flow control device within an effluent gas treatment system housing, the flow control device comprising a vertically arranged elongated first portion, and a vertically arranged second portion, arranged a predetermined distance above a partly porous bottom surface of the effluent gas treatment system housing, supplying alumina to the flow control device from an alumina supply for a gravity feed of alumina through the flow control device to an alumina hopper for alumina supply to an electrolytic cell and to a dry scrubber contact reactor, and controlling a rate of supply of alumina to the dry scrubber contact reactor based on alumina demand by the electrolytic cell.

In summary, the subject effluent gas treatment system comprises a singular, singularly dedicated, effluent gas treatment system arranged at a level vertically above that of a singular aluminum electrolytic cell, a housing defining an interior area of the singular effluent gas treatment system, a flow control device arranged vertically within the interior area comprising an elongated hollow first portion and a tapered second portion arranged a predetermined distance from a partly porous bottom surface of the housing, an adsorbent hopper extending across the partly porous bottom surface of the housing between the flow control device and a dry scrubber contact reactor, a feeding pipe fluidly connected between the adsorbent hopper and the singular aluminum electrolytic cell for supplying adsorbent to the singular aluminum electrolytic cell, and an effluent gas outlet in a cell housing for the singular electrolytic cell, fluidly connected to the dry scrubber contact reactor for interaction of the effluent gas with adsorbent supplied from the adsorbent hopper to produce contacted gas. The effluent gas treatment system further comprises air booster devices to alter or boost adsorbent fluidization within the system. The subject effluent gas treatment system further comprises a fabric filter operable to remove particulate adsorption products and dust from the contacted gas. The fabric filter comprises a plurality of removable fabric filter bags arranged within the housing at a level vertically above that of the flow control device, adsorbent hopper, and the dry scrubber contact reactor. The flow control device and/or a portion of the dry scrubber contact reactor may be movable to affect adsorbent fluidization, and the flow control device of the effluent gas treatment system controls a rate of supply of adsorbent to the dry scrubber contact reactor based on a rate of adsorbent demand by the electrolytic cell.

In summary the subject flow control device comprises a vertically arranged elongated hollow first portion, a vertically arranged second portion defining an open interior area, the second portion comprising a tapered wall extending between a base edge and a connection top, wherein the connection top is fluidly connected to a bottom open end of the first portion, an adsorbent supply fluidly connected to an open top end of the first portion, and a portion of an adsorbent hopper arranged a predetermined distance vertically below the flow control device, wherein the flow control device is mechanically operable to control a rate of supply of adsorbent to a dry scrubber contact reactor based on a rate of adsorbent demand by an aluminum electrolytic cell. The base edge of the second portion of the subject flow control device is arranged vertically below a top surface of adsorbent in the adsorbent hopper. Further, the first portion of the subject flow control device is tubular or similar hollow configuration. The base edge of the second portion of the subject flow control device is of a larger dimension than that of the connection top of the second portion.

In summary a method of using the subject flow control device comprises arranging the flow control device comprising a vertically arranged elongated hollow first portion, a vertically arranged second portion defining an open interior area, the second portion comprising a tapered wall extending between an open free base edge and a connection top, wherein the connection top is fluidly connected to a bottom outlet end of the first portion, an adsorbent supply fluidly connected to an open top inlet end of the first portion, and a portion of an adsorbent hopper arranged a predetermined distance vertically below the flow control device, and operating the flow control device to control a rate of supply of adsorbent to a dry scrubber contact reactor based on a rate of adsorbent demand by an aluminum electrolytic cell. According to the subject method, adsorbent flows via gravity through the flow control device from the open top inlet end of the first portion to the open free base edge of the second portion. The adsorbent is alumina. The subject method further comprises increasing the rate of supply of adsorbent to the dry scrubber contact reactor via an air booster device.

The subject method further comprises reducing the rate of supply of adsorbent to the dry scrubber contact reactor through static adsorbent build-up in an open interior area defined by the second portion. The method further comprises reducing the rate of supply of adsorbent flow through the flow control device to the dry scrubber contact reactor through static adsorbent build-up in an open interior area defined by the second portion and static adsorbent build-up below the second portion. According to the subject method, the open free base edge of the second portion is of a larger dimension than that of the connection top of the second portion. Also, according to the subject method, the connection top of the second portion is of like dimension and configuration as that of the bottom outlet end of the first portion.

A benefit of the subject system is that control of the alumina and fluoride balance may be electrolytic cell specific. Hence, if one electrolytic cell for some reason is generating more hydrogen fluoride gas, the feeder may be actuated to supply more alumina to the electrolytic cell to adsorb more fluoride to reduce the amount of fluoride lost from the electrolytic cell. Further, when the feeder is actuated, the crust breaker is first operated inside the bath to open a hole through which the alumina is supplied into the bath contents. This operation generates a significant amount of hydrogen fluoride gas. As such, during the operation the feeder supplies more alumina to the electrolytic cell. The additional alumina supplied to the electrolytic cell adsorbs more fluoride to reduce the amount of fluoride lost from the electrolytic cell during the operation.

Preferably, a hydrogen fluoride sensor, sulphur dioxide sensor and/or perfluorinated chemicals sensor is installed on or relatively near the treated gas outlet for additional feeder control via a controller, and emissions control. Further objects and features of the present disclosure will be apparent from the following detailed description and claims.

BRIEF DESCRIPTION OF THE DRAWINGS

The present disclosure is described in more detail below with reference to the appended drawings in which.

DETAILED DESCRIPTION

Figure 1:
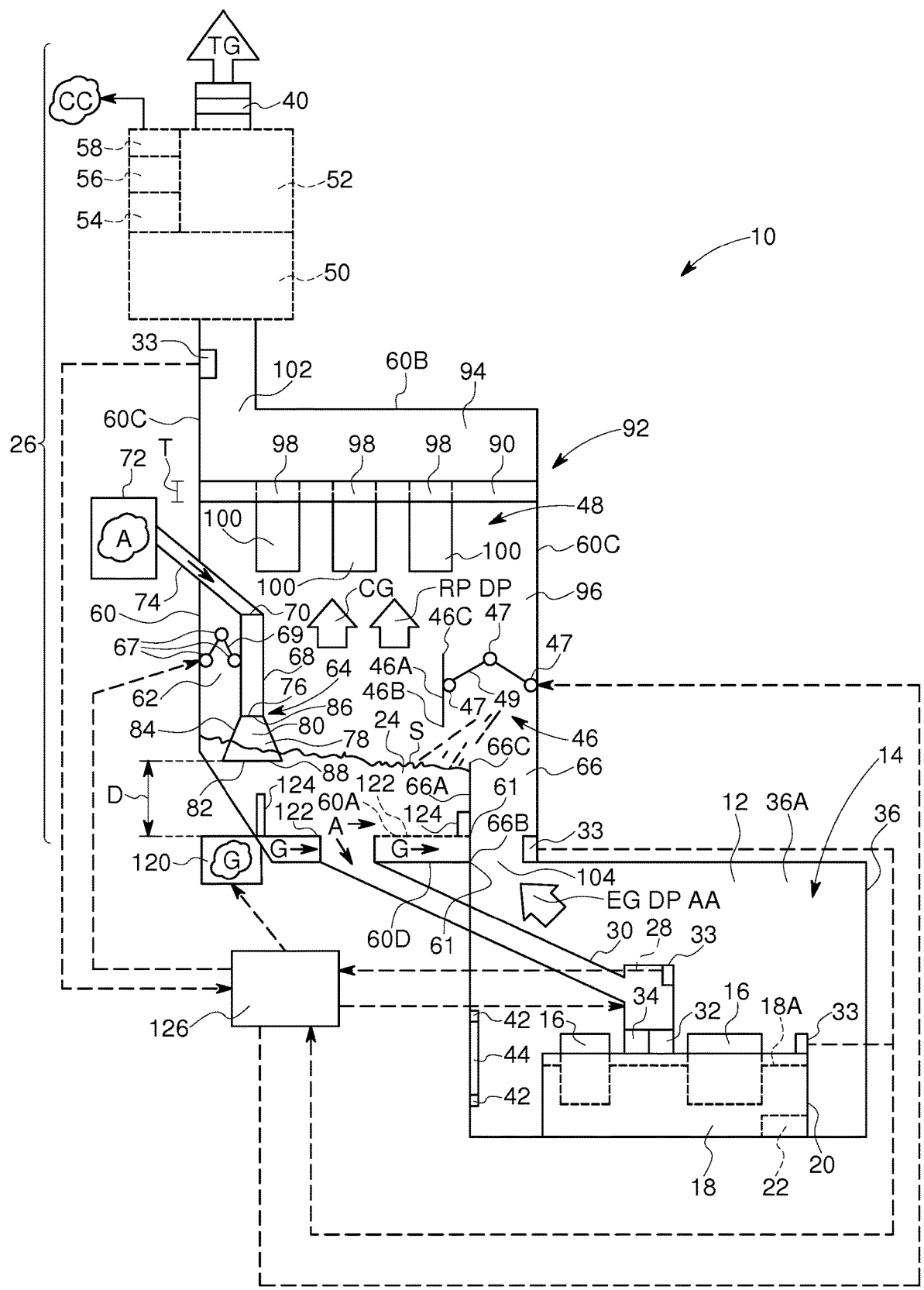
FIG. 1 is a schematic side cross sectional view of an aluminium production plant equipped with an embodiment of the subject effluent gas treatment system.
Figure 2:
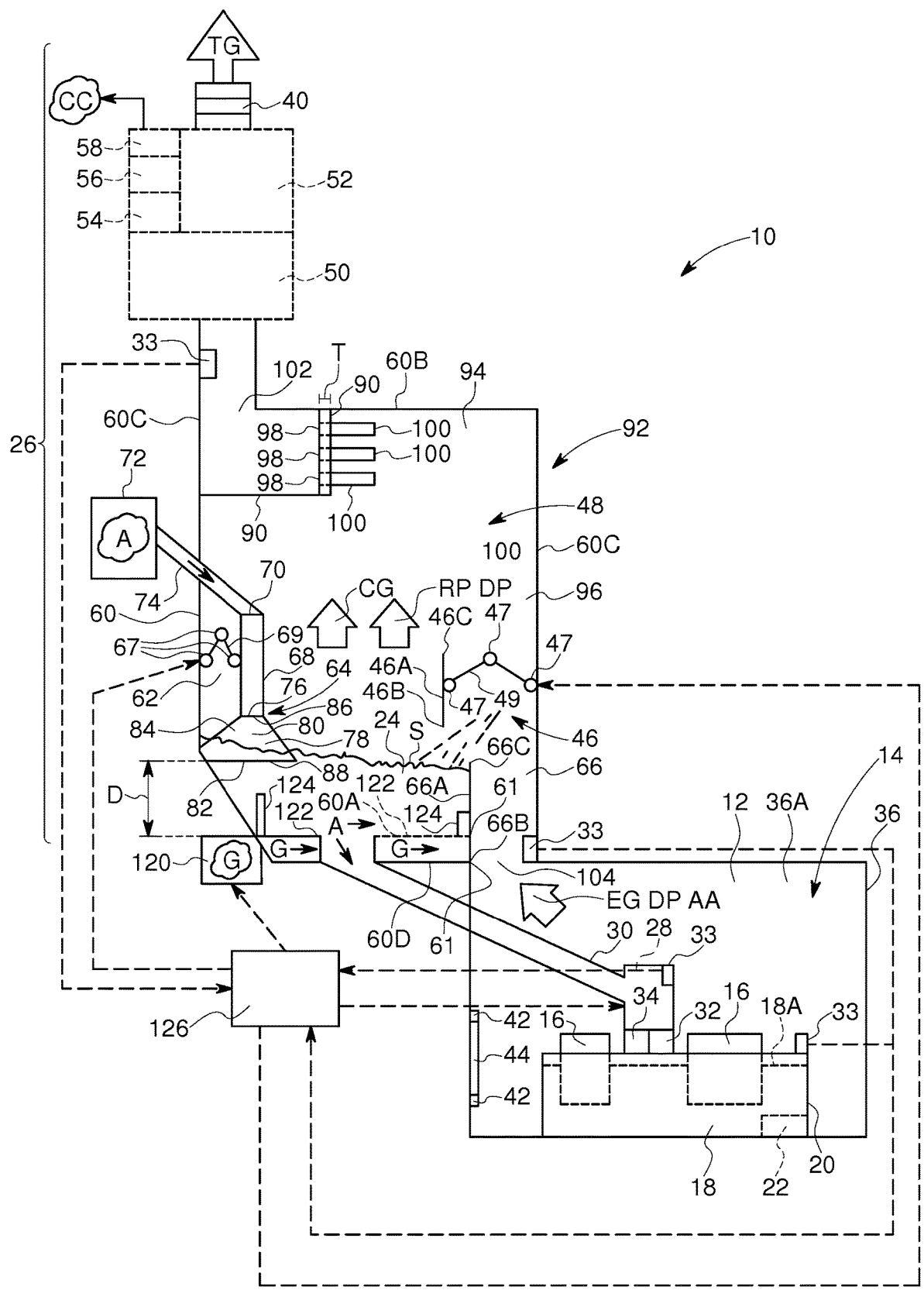
FIG. 2 is a schematic side cross sectional view of an aluminium production plant equipped with another embodiment of the subject effluent gas treatment system.

FIGS. 1 and 2 are each schematic representations of an aluminum production plant 10. The main components of aluminum production plant 10 include an aluminum production electrolytic cell room 12 in which a plurality of aluminum production electrolytic cells 14 may be arranged. In each of FIGS. 1 and 2, only one aluminum production electrolytic cell 14 is depicted for purposes of clarity and simplicity, but it will be appreciated that electrolytic cell room 12 may typically comprise 50 to 200 electrolytic cells 14. Each aluminum production electrolytic cell 14 comprises a number of anode electrodes 16, typically six to thirty anode electrodes 16, typically arranged in two parallel rows extending along the length of electrolytic cell 14 and extending into contents 18 of bath 20. The electrolytic cell 14 also comprises one or more cathode electrodes 22. The process occurring in the electrolytic cell 14 may be the well-known Hall-Héroult process in which aluminum oxide or alumina A, language used interchangeably herein, is dissolved in a melt of fluorine containing minerals and electrolyzed to produce aluminum. Hence, electrolytic cell 14 functions as an electrolysis cell. Powdered aluminum oxide A is supplied to electrolytic cell 14 from an alumina hopper 24 integrated in an effluent gas treatment system 26 singularly dedicated to a single electrolytic cell 14. Powdered aluminum oxide A is supplied to the bath 20 by means of feeders 28 controlled by a controller 126. Each feeder 28 is provided with a feeding pipe 30, a feed port 32, and a crust breaker 34 operative for forming an opening in a crust that often forms on a surface 18A of contents 18. An example of a crust breaker 34 is described in U.S. Pat. No. 5,045,168. Each feeder 28 is electronically connected to the controller 126. Controller 126 may also be electronically connected to a hydrogen fluoride sensor 33 arranged in treated gas outlet 102. An example of a hydrogen fluoride sensor 33 is disclosed in EP 2181753. Other sensors 33 may likewise be arranged in the treated gas outlet 102, such as a sulphur dioxide sensor, a perfluorinated chemicals sensor, a carbon dioxide sensor, and/or a similar pollutant sensor. Controller 126 may also be electronically connected to air supply 120 and booster devices 124. Controller 126 is discussed in more detail below.

The electrolysis process occurring in electrolytic cell 14 generates large amounts of heat H, dust particles DP, and effluent gas EG including but not limited to hydrogen fluoride, sulphur dioxide and carbon dioxide, i.e., pollutants.

A cell housing 36 defines an interior area 36A in which bath 20 is arranged. An effluent gas EG inlet 66 is fluidly connected to interior area 36A. A fan 40 draws effluent gas EG from interior area 36A and through the effluent gas treatment system 26. Fan 40 is preferably located downstream of effluent gas treatment system 26 to generate a negative pressure in the effluent gas treatment system 26. However, fan 40 could also, as an alternative, be arranged elsewhere depending on plant 10 requirements. Fan 40 creates via fluidly connected effluent gas EG inlet 66 a suction in interior area 36A of cell housing 36. As a result of the negative pressure in cell housing 36, a volume of ambient air AA is drawn into interior area 36A mainly via gaps or openings 42 at side wall doors 44. The effluent gas EG drawn from interior area 36A via effluent gas EG inlet 66 comprises effluent gas EG, dust particles DP generated in the aluminum production process, and a volume of ambient air AA.

In effluent gas treatment system 26, effluent gas EG is mixed in dry scrubber contact reactor 46, with an adsorbent, which is typically aluminum oxide A that is thereafter utilized in the aluminum production process. Aluminum oxide A interacts with some components of the effluent gas EG, particularly hydrogen fluoride, HF, and sulphur dioxide, $SO_2$. The particulate adsorption products PP formed by the reaction of aluminum oxide A with hydrogen fluoride and sulphur dioxide are separated from the contacted gas CG by a fabric filter 48. In addition to removing hydrogen fluoride and sulphur dioxide from the effluent gas EG, effluent gas treatment system 26 via fabric filter 48 also separates at least a portion of the dust particles DP entrained in the effluent gas EG from interior area 36A.

Optionally, treated gas TG flowing out of effluent gas treatment system 26 via treated gas outlet 102 is further treated in a sulphur dioxide removal device 50. Sulphur dioxide removal device 50 removes most of the sulphur dioxide remaining in the treated gas TG after treatment in effluent gas treatment system 26. Sulphur dioxide removal device 50 may for example be a seawater scrubber, such as that disclosed in U.S. Pat. No. 5,484,535, a limestone wet scrubber, such as that disclosed in EP 0 162 536, or another such device that utilizes an alkaline absorption substance for removing sulphur dioxide from production gas.

Optionally, treated gas TG flowing from effluent gas treatment system 26, or from the sulphur dioxide removal device 50, is further treated in a carbon dioxide removal device 52, operable to remove at least some of the carbon dioxide from the treated gas TG. Carbon dioxide removal device 52 may be of any type suitable for removing carbon dioxide gas from production gas. An example of a suitable carbon dioxide removal device 52 is that which is equipped for a chilled ammonia process. In a chilled ammonia process, treated gas TG is contacted with, for example, ammonium carbonate and/or ammonium bicarbonate solution or slurry at a low temperature, such as 0° to 10° C., in an absorber 54. The solution or slurry selectively absorbs carbon dioxide gas from the treated gas TG. Hence, treated gas TG, containing mainly nitrogen gas and oxygen gas, flow from absorber 54 for release to the atmosphere. The spent ammonium carbonate and/or ammonium bicarbonate solution or slurry is transported from absorber 54 to a regenerator 56 in which the ammonium carbonate and/or ammonium bicarbonate solution or slurry is heated to a temperature of, for example, 50° to 150° C. causing a release of the carbon dioxide in concentrated gas form. The regenerated ammonium carbonate and/or ammonium bicarbonate solution or slurry is then returned to the absorber 54. The concentrated carbon dioxide gas flows from regenerator 56 to a gas processing unit 58 in which the concentrated carbon dioxide gas is compressed. The compressed concentrated carbon dioxide CC may be disposed of, for example by being pumped into an old mine, or the like. An example of a carbon dioxide removal device 52 of the type described is disclosed in US 2008/0072762. It will be appreciated that other carbon dioxide removal devices 52 may also be utilized.

Although the subject effluent gas treatment system 26 is described herein as singularly dedicated to an electrolytic cell 14, the scope of the subject disclosure encompasses applications wherein use of the subject effluent gas treatment system 26 may be dedicated to more than one electrolytic cell 14. In the singularly dedicated effluent gas treatment system 26 arranged at a level vertically above that of the electrolytic cell 14, effluent gas EG flows upwardly through the dry scrubber contact reactor 46. The subject dry scrubber contact reactor 46 is arranged downstream of the alumina hopper 24, which extends horizontally across a porous bottom surface 60A of the effluent gas treatment system 26 housing 60. Porous bottom surface 60A, as used herein, collectively refers to either a wholly porous surface or a partially porous surface depending upon needs of the effluent gas treatment system 26. Arranged a distance vertically below porous bottom surface 60A is solid base wall 60D. The effluent gas treatment system 26 housing 60 comprises a top 60B, a porous bottom surface 60A with a solid base wall 60D therebelow, and two opposed side walls 60C defining an open interior 62. The dry scrubber contact reactor 46 is supplied a fluidized and/or gravity flow of alumina A from the alumina hopper 24. As such, the alumina A flows across the porous bottom surface 60A of the effluent gas treatment system 26 from a flow control device 64 to the dry scrubber contact reactor 46 equipped with the effluent gas EG inlet 66. Within the dry scrubber contact reactor 46, alumina A is dispersed into and mixed with the effluent gas EG flowing into the effluent gas treatment system 26 housing 60 via effluent gas EG inlet 66. Effluent gas EG inlet 66 is arranged between a portion of side wall 60C and a retaining wall 66A with a base end 66B abutting free ends 61 of porous bottom surface 60A and solid base wall 60D and extending vertically upwardly from the base end 66B to a free overflow edge 66C. Retaining wall 66A is distanced from side wall 60C to allow a flow of effluent gas EG therebetween into dry scrubber contact reactor 46. Similarly, dry scrubber contact reactor 46 is arranged between a movable scrubber free wall 46A that extends generally parallel to side wall 60C from a free base end 46B vertically to an opposed free top end 46C. Scrubber free wall 46A may be electronically movable via controller 126 and/or manually movable through adjustment of an arm 49 equipped with hinges 47 connected thereto. Arm 49, connected to side wall 60C may have a hinge 47 arranged at or near side wall 60C. Arm 49, connected to scrubber free wall 46A may have a hinge 47 arranged at or near scrubber free wall 46A. Further, arm 49 may have a hinge 47 arranged between those of side wall 60C and scrubber free wall 46A. Arm 49 equipped with hinges 47, or a similar movable mechanical device, enables electronic movement through controller 126, or manual movement, of scrubber free wall 46A vertically, i.e., closer to or farther from porous bottom surface 60A, and horizontally, i.e., closer to or farther from side wall 60C. Hence, upon arrangement of scrubber free wall 46A relatively closer to porous bottom surface 60A, supply of alumina A to the dry scrubber contact reactor 46 is decreased. Upon arrangement of scrubber free wall 46A relatively farther from porous bottom surface 60A, supply of alumina A to the dry scrubber contact reactor 46 is increased. Upon arrangement of scrubber free wall 46A relatively closer to adjacent side wall 60C, supply of alumina A to the dry scrubber contact reactor 46 is decreased. Upon arrangement of scrubber free wall 46 A relatively farther from adjacent side wall 60C, supply of alumina A to the dry scrubber contact reactor 46 is increased. Through movement and positioning of scrubber free wall 46A, supply of alumina A to the dry scrubber contact reactor 46 may be controlled or adjusted. The flow control device 64 comprises a first portion 68 formed of an elongated tubular or other similar hollow configuration. The first portion 68 is arranged vertically with a top inlet end 70 fluidly connected to a primary alumina supply 72 via an adjustable duct 74. An opposed bottom outlet end 76 of the first portion 68 is connected to or unitarily formed with a vertically arranged second portion 78. The second portion 78 defines an open interior area 80 extending from a free base edge 82 of sides 84 that extend tapering inwardly and upwardly to a connection end 86. The connection end 86 of the second portion 78 fluidly connects to the bottom outlet end 76 of the first portion 68. As such, alumina A flows via gravity through the flow control device 64 from the top inlet end 70 of the first portion 68 to a base opening 88 defined by the free base edge 82 of the second portion 78. Although the subject flow control device 64 is described herein as having a tubular first portion 68 and a tapered second portion 78 for controlled gravity flow, the scope of the subject disclosure encompasses other shapes and/or configurations functionable as the subject flow control device 64 disclosed herein. The flow control device 64 may be movable. Flow control device 64 may be electronically movable via controller 126 and/or manually movable through adjustment of an arm 69 with hinges 67 connected thereto. Arm 69, connected to side wall 60C may be equipped with a hinge 67 at or near side wall 60C. Arm 69, connected to flow control device 64 may be equipped with a hinge 67 at or near flow control device 64. Further, arm 69 may be equipped with a hinge 67 between those of side wall 60C and flow control device 64. Arm 69 equipped with hinges 67 enables electronic movement via controller 126, or manual movement, of flow control device 64 vertically, i.e., closer to or farther from porous bottom surface 60A, and horizontally, i.e., closer to or farther from side wall 60C. Hence, upon arrangement of flow control device 64 relatively closer to porous bottom surface 60A, supply of alumina A to the alumina hopper is decreased. Upon arrangement of flow control device 64 relatively farther from porous bottom surface 60A, supply of alumina A to the alumina hopper is increased. Upon arrangement of flow control device 64 relatively closer to adjacent side wall 60C, supply of alumina A to the alumina hopper is decreased. Upon arrangement of flow control device 64 relatively farther from adjacent side wall 60C, supply of alumina A to the alumina hopper is increased. Through movement and positioning of flow control device 64, supply of alumina A to the electrolytic cell 14 and the dry scrubber contact reactor 46 may be controlled or adjusted.

Since the electrolytic cell 14 is supplied alumina A from the alumina hopper 24 that also supplies alumina A to the dry scrubber contact reactor 46, alumina A demand by the electrolytic cell 14 determines or controls the rate of alumina supply to the singularly dedicated dry scrubber contact reactor 46. Accordingly, alumina A is transported from a primary alumina supply 72, to the flow control device 64 arranged vertically within the effluent gas treatment system 26 housing 60 for a gravity fed flow of alumina A therethrough. The free base edge 82 of the flow control device 64 is arranged a predetermined distance D from the porous bottom surface 60A of the effluent gas treatment system 26 housing 60 within the flow of alumina A within the alumina hopper 24. According to one embodiment, an air supply 120 is fluidly connected to housing 60 to supply air G between solid base wall 60D and porous bottom surface 60A at ends 63, opposite free ends 61. Air supply 120 may be a fan, a blower, or similar such device. Air G supplied between solid base wall 60D and porous bottom surface 60A flows upwardly through openings 122 arranged across all, a portion or portions of porous bottom surface 60A thereby fluidizing a portion of alumina A supported by porous bottom surface 60A. As such, a certain static amount of alumina A intentionally builds under the second portion 78 of the flow control device 64 and adjacent side wall 60C of the effluent gas treatment system 26 housing 60. As the static amount of alumina A builds within the open interior area 80 of the second portion 78, gravity flow of alumina A through the first portion 68 is slowed or blocked. As a certain fluidized amount of alumina A flows from the second portion 78 to the alumina hopper 24 supplying alumina A to the electrolytic cell 14 via a feeding pipe 30, a portion of the static amount of the alumina A shifts via gravity to again allow a flow of alumina A from the first portion 68 unless or until the flow is again slowed or blocked by the static amount of alumina A built up under the second portion 78 of the flow control device 64. Through this ebb and flow of alumina A from the flow control device 64, alumina A is supplied to the electrolytic cell 14 and flow of alumina A to the dry scrubber contact reactor 46 downstream of the feeding pipe 30 to the electrolytic cell 14, is controlled. For further, possibly as an "as needed" intermittent boost, air supply 120 may be connected to one or more air booster devices 124. According to one embodiment, an air booster device 124 may be arranged at side wall 60C below flow control device 64. Air booster device 124 below flow control device 64 may be used intermittently to locally increase air G supply to intermittently alter or increase fluidization conditions under the second portion 78 of the flow control device 64. According to another embodiment, an air booster device 124 may be arranged above porous bottom surface 60A at retainer wall 66A. Air booster device 124 may be used intermittently at retainer wall 66A to locally increase air G supply to intermittently alter or increase alumina A supply to the dry scrubber contact reactor 46.

The subject fabric filter 48 is arranged in an upper portion 92 of the effluent gas treatment system 26 housing 60 at a level vertically above that of the flow control device 64, alumina hopper 24, and dry scrubber contact reactor 46. The subject fabric filter 48 comprises a support wall 90 arranged within the upper portion 92 of the effluent gas treatment system 26 housing 60 fluidly separating an "after-filter" area 94 on one side of the support wall 90 from a "before-filter" area 96 on an opposite side of the support wall 90. A plurality of openings 98 extends through a thickness T of the support wall 90, with each opening 98 equipped with a replaceable fabric filter bag 100 that extends from the opening 98 into the before-filter area 96. Arranged within the after-filter area 94 is a treated gas outlet 102 through which treated gas TG flows outwardly from the after-filter area 94 of the effluent gas treatment system 26 housing 60, to optional further treatment equipment 50, 52 or to the atmosphere.

In FIG. 1, side 84 of lower portion 78 of flow control device 64 is arranged adjacent to housing 60 side wall 60C, and the fabric filter 48 is arranged vertically, i.e., the fabric filter bags 100 extending vertically. Another embodiment, schematically illustrated in FIG. 2, side 84 of lower portion 78 of flow control device 64 is of an abridged configuration to enable a relatively closer abutting arrangement with housing 60 side wall 60C, and the fabric filter 48 is arranged horizontally, i.e., the fabric filter bags 100 extending horizontally. Further, embodiments with the flow control device 64 arranged adjacent to housing 60 side wall 60C (as illustrated in FIG. 1) and the fabric filter 48 arranged horizontally (as illustrated in FIG. 2), or the flow control device 64 in an abridged configuration (as illustrated in FIG. 2) and the fabric filter 48 arranged vertically (as illustrated in FIG. 1), are also considered within the scope of this disclosure.

A method of using the subject effluent gas treatment system 26 comprises arranging the subject effluent gas treatment system 26 at a level vertically above that of an electrolytic cell 14 producing aluminum, fluidly connecting the subject effluent gas treatment system 26 to the electrolytic cell 14 via a feeding pipe 30 and an effluent gas outlet 104. As such, the feeding pipe 30 is connected to the alumina hopper 24, and the effluent gas outlet 104 is connected to the effluent gas EG inlet 66 of dry scrubber contact reactor 46. Alumina A is supplied to the effluent gas treatment system 26 via the flow control device 64, wherein the flow control device 64 supplies alumina A to the electrolytic cell 14 and the dry scrubber contact reactor 46 at a rate based on electrolytic cell 14 demand. The alumina A supplied to the dry scrubber contact reactor 46 interacts with the effluent gas EG in the dry scrubber contact reactor 26 for pollutant removal from the effluent gas EG to produce contacted gas CG entrained with particulate adsorption products PP. The method further comprises removing the particulate adsorption products PP from the contacted gas CG in an associated fabric filter 48 to produce treated gas TG.

A method of using the subject flow control device 64 for alumina A supply comprises providing the vertically arranged flow control device 64 within an effluent gas treatment system 26 housing 60, the flow control device 64 comprising a vertically arranged elongated first portion 68, and a vertically arranged second portion 78, arranged a predetermined distance D above a horizontal porous bottom surface 60A of the effluent gas treatment system 26 housing 60, supplying alumina A to the flow control device 64 from a primary alumina supply 72 for a gravity feed of alumina A through the flow control device 64 to an alumina hopper 24 for alumina A supply to an electrolytic cell 14 and to a dry scrubber contact reactor 46, and controlling a rate of supply of alumina A to the dry scrubber contact reactor 46 based on alumina A demand by the electrolytic cell 14.

A benefit of the subject plant 10 is that control of the alumina A and fluoride balance is electrolytic cell 14 specific. Hence, if an electrolytic cell 14 for some reason is generating more hydrogen fluoride gas, the hydrogen fluoride sensor 33 electronically transmits the hydrogen fluoride measurement to the controller 126, and via electronic control via the controller 126, the feeder 28 will supply more alumina A to the electrolytic cell 14 to adsorb more fluoride to reduce the amount of fluoride lost from the electrolytic cell 14. Further, when the feeder 28 is actuated, the crust breaker 34 is first operated inside the bath 20 to open a hole through which the alumina A is supplied into the bath 20 contents 18. This operation generates a significant amount of hydrogen fluoride gas. As such, during the operation the feeder 28 will supply more alumina A to the electrolytic cell 14. The additional alumina A supplied to the electrolytic cell 14 adsorbs more fluoride to reduce the amount of fluoride lost from the electrolytic cell 14 during the operation. Preferably, the hydrogen fluoride sensor 33 is arranged on or relatively near the effluent gas EG outlet 102 for controller 126 control of feeder 28 supply of alumina A to electrolytic cell 14. Additionally, one or more hydrogen fluoride sensors 33 may be arranged in various other locations within aluminium production plant 10, such as but not limited to adjacent feeder 28 and/or adjacent effluent gas outlet 104. Like the hydrogen fluoride sensors 33, other sensors 33 may also be arranged in plant 10, such as sulphur dioxide sensors, carbon dioxide sensors, perfluorinated chemicals sensors, and/or similar pollutant sensors, for emissions control.

In summary, the subject effluent gas treatment system 26 comprises a singular, singularly dedicated effluent gas treatment system 26 arranged at a level vertically above that of a singular aluminum electrolytic cell 14, a housing 60 defining an interior area 62 of the singular effluent gas treatment system 26, a flow control device 64 arranged vertically within the interior area 62 comprising an elongated hollow first portion 68 and a tapered second portion 78 arranged a predetermined distance D from a horizontal porous bottom surface 60A of the housing 60, an adsorbent hopper 24 extending across the horizontal porous bottom surface 60A of the housing 60 between the flow control device 64 and a dry scrubber contact reactor 46, a feeding pipe 30 fluidly connected between the adsorbent hopper 24 and the singular aluminum electrolytic cell 14 for supplying adsorbent to the singular aluminum electrolytic cell 14, and an effluent gas outlet 104 in a cell housing 36 for the singular electrolytic cell 14, fluidly connected to the effluent gas EG inlet 66 of dry scrubber contact reactor 46 for reaction of the effluent gas EG with adsorbent supplied from the adsorbent hopper 24 to produce contacted gas CG. The subject effluent gas treatment system 26 further comprises air booster devices 124 to alter or boost adsorbent fluidization within the system 26. The subject effluent gas treatment system 26 further comprises a fabric filter 48 operable to remove particulate adsorption products PP and dust DP from the contacted gas CG. The fabric filter 48 comprises a plurality of removable fabric filter bags 100 arranged within the housing 60 at a level vertically above that of the flow control device 64, adsorbent hopper 24, and the dry scrubber contact reactor 46. The flow control device and/or a portion of the dry scrubber contact reactor is movable to affect adsorbent fluidization and/or flow, and the flow control device 64 of the effluent gas treatment system 26 controls a rate of supply of adsorbent to the dry scrubber contact reactor 46 based on a rate of adsorbent demand by the electrolytic cell 14.

In summary, the subject flow control device 64 comprises a vertically arranged elongated hollow first portion 68, a vertically arranged second portion 78 defining an open interior area 80, the second portion 78 comprising a tapering wall 84 extending between a base edge 82 and a connection top 86, wherein the connection top 86 is fluidly connected to a bottom open end 76 of the first portion 68, an adsorbent supply 72 fluidly connected to an open top end 70 of the first portion 68, and a portion of an adsorbent hopper 24 arranged a predetermined distance D vertically below the flow control device 64, wherein the flow control device 64 is mechanically operable to control a rate of supply of adsorbent to a dry scrubber contact reactor 46 based on a rate of adsorbent demand by an aluminum electrolytic cell 14. The base edge 82 of the second portion 78 of the subject flow control device 64 is arranged vertically below a top surface S of adsorbent in the adsorbent hopper 24. Further, the first portion 68 of the subject flow control device 64 is tubular or of a similar hollow configuration. The base edge 82 of the second portion 78 of the subject flow control device 64 is of a larger dimension than that of the connection top 86 of the second portion 78.

In summary, a method of using the subject flow control device 64 comprises arranging the flow control device 64 comprising a vertically arranged elongated hollow first portion 68, a vertically arranged second portion 78 defining an open interior area 80, the second portion 78 comprising a tapering wall 84 extending between an open free base edge 82 and a connection top 86, wherein the connection top 86 is fluidly connected to a bottom outlet end 76 of the first portion 68, an adsorbent supply 72 fluidly connected to an open top inlet end 70 of the first portion 68, and a portion of an adsorbent hopper 24 arranged a predetermined distance D vertically below the flow control device 64, and operating the flow control device 64 to control a rate of supply of adsorbent to a dry scrubber contact reactor 46 based on a rate of adsorbent demand by an aluminum electrolytic cell 14. According to the subject method, adsorbent flows via gravity through the flow control device 64 from the open top inlet end 70 of the first portion 68 to the open free base edge 82 of the second portion 78. The adsorbent is alumina A. The subject method further comprises increasing the rate of supply of adsorbent to the dry scrubber contact reactor 46 via an air booster device 124. The subject method further comprises reducing the rate of supply of adsorbent to the dry scrubber contact reactor 46 through static adsorbent build-up in an open interior area 80 defined by the second portion 78. The method further comprises reducing the rate of supply of adsorbent flow through the flow control device 64 to the dry scrubber contact reactor 46 through static adsorbent build-up in an open interior area 80 defined by the second portion 78 and static adsorbent build-up below the second portion 78. According to the subject method, the open free base edge 82 of the second portion 78 is of a larger dimension than that of the connection top 86 of the second portion 78. Also, according to the subject method, the connection top 86 of the second portion 78 is of like dimension and configuration as that of the bottom outlet end 76 of the first portion 68.

While the present disclosure has been described with reference to a number of embodiments, it will be understood by those skilled in the art that various changes may be made and equivalents may be substituted for elements without departing from the scope thereof. In addition, many modifications may be made to adapt a particular situation or material to the teachings of this disclosure without departing from the essential scope thereof. Therefore, it is intended that this disclosure not be limited to the particular embodiments disclosed as the best mode contemplated for carrying out the disclosure, but that the disclosure will include all embodiments falling within the scope of the appended claims. Moreover, the use of the terms first, second, etc., do not denote any order or importance, but rather the terms first, second, etc., are used to distinguish one element from another.

The invention claimed is:

1. An effluent gas treatment system (26) comprising:
   a dedicated effluent gas treatment system (26) arranged a level vertically above that of an aluminum electrolytic cell (14);
   a housing (60) having an at least partially porous bottom (60 A) and defining an interior area (62) of the dedicated effluent gas treatment system (26);
   a flow control device (64) arranged vertically within the interior area (62) comprising an elongated hollow first portion (68) and a tapered second portion (78), the flow control device (64) arranged a predetermined distance (D) from the at least partially porous bottom (60 A) of the housing (60);
   an adsorbent hopper (24) extending across the at least partially porous bottom (60 A) of the housing (60) between the flow control device (64) and a dry scrubber contact reactor (46);
   a feeding pipe (30) fluidly connected between the adsorbent hopper (24) and the aluminum electrolytic cell (14) for supplying adsorbent (A) to the aluminum electrolytic cell (14); and
   an effluent gas outlet (104) in a cell housing (36) for the aluminum electrolytic cell (14), fluidly connected to the dry scrubber contact reactor (46) for interaction of the effluent gas (EG) with adsorbent (A) supplied from the adsorbent hopper (24) to produce contacted gas (CG).

2. The effluent gas treatment system (26) of claim 1, further comprising booster devices (124) to alter or boost adsorbent (A) fluidization within the effluent gas treatment system (26).

3. The effluent gas treatment system (26) of claim 1, further comprising a fabric filter (48) comprising a plurality of removable fabric filter bags (100) arranged within the housing (60) at a level vertically above that of the flow control device (64), the adsorbent hopper (24), and the dry scrubber contact reactor (46).

4. The effluent gas treatment system (26) of claim 1, wherein the flow control device (64) and/or a portion of the dry scrubber contact reactor (46) is movable to affect a rate of supply of adsorbent (A).

5. A flow control device (64) comprising:
   a vertically arranged elongated hollow first portion (68) having an open bottom end (76) and an open top end (70);
   a vertically arranged second portion (78) defining an open interior area (80), the second portion (78) comprising a tapering wall (84) extending between a base edge (82) and a connection top (86), wherein the connection top (86) is fluidly connected to the open bottom end (76) of the first portion (68);
   an adsorbent supply (72) fluidly connected to the open top end (70) of the first portion (68); and
   a portion of an adsorbent hopper (24) arranged a predetermined distance (D) vertically below the flow control device (64);
   wherein the flow control device (64) is mechanically operable to control a rate of supply of adsorbent (A) to a dry scrubber contact reactor (46) based on a rate of adsorbent (A) demand by an aluminum electrolytic cell (14).

6. The flow control device (64) of claim 5, wherein the base edge (82) of the second portion (78) is arranged vertically below a top surface (S) of adsorbent (A) in the adsorbent hopper (24).

7. The flow control device (64) of claim 5, wherein the first portion (68) is tubular.

8. The flow control device (64) of claim 5, wherein the base edge (82) of the second portion (78) is of a larger dimension than that of the connection top (86) of the second portion (78).

9. A method of using a flow control device (64) comprising:
   providing the flow control device (64) assembled by:
   vertically arranging an elongated hollow first portion (68) having an open bottom end (76) and an open top end (70);

vertically arranging a second portion (78) defining an open interior area (80), the second portion (78) comprising a tapered wall (84) extending between base edge (82) and a connection top (86), wherein the connection top (86) is fluidly connected to the open bottom end (76) of the first portion (68);

fluidly connecting an adsorbent supply (72) to the open top end (70) of the first portion (68); and arranging a portion of an adsorbent hopper (24) at a predetermined distance (D) vertically below the flow control device (64); and operating the flow control device (64) to control a rate of supply of adsorbent (A) to a dry scrubber contact reactor (46) based on a rate of adsorbent (A) demand by an aluminum electrolytic cell (14).

10. The method of claim 9, wherein adsorbent (A) flows via gravity through the flow control device (64) from the open top end (70) of the first portion (68) to the base edge (82) of the second portion (78).

11. The method of claim 9, further comprising increasing the rate of supply of adsorbent (A) to the dry scrubber contact reactor (46) via a booster device (124).

12. The method of claim 9, further comprising reducing the rate of supply of adsorbent (A) to the dry scrubber contact reactor (46) through static adsorbent (A) build-up in the open interior area (80) defined by the second portion (78).

13. The method of claim 9, further comprising reducing the rate of supply of adsorbent (A) flow through the flow control device (64) to the dry scrubber contact reactor (46) through static adsorbent (A) build-up in the open interior area (80) defined by the second portion (78) and static adsorbent (A) build-up below the second portion (78).

14. The method of claim 9, wherein the base edge (82) of the second portion (78) is of a larger dimension than that of the connection top (86) of the second portion (78).

15. The method of claim 9, wherein the connection top (86) of the second portion (78) is of like dimension and configuration as that of the open bottom end (76) of the first portion (68).

* * * * *